Sept. 21, 1954

F. C. BYRAM ET AL

Re. 23,870

FLAT ROTARY PUMP

Original Filed April 29, 1950

INVENTORS.
FREDERICK C. BYRAM
AND SHELDON S. L. CHANG,
BY

Allen & Allen

ATTORNEYS.

Reissued Sept. 21, 1954

Re. 23,870

UNITED STATES PATENT OFFICE 23,870

FLAT ROTARY PUMP

Frederick Cameron Byram, New Carlisle, Ohio, and Sheldon S. L. Chang, New York, N. Y., assignors to Robbins & Myers, Inc., Springfield, Ohio, a corporation of Ohio Original No. 2,590,751, dated March 25, 1952, Serial No. 159,078, April 29, 1950. Application for reissue June 10, 1953, Serial No. 360,855

8 Claims. (Cl. 103—133)

Matter enclosed in heavy brackets [ ] appears in the original patent but forms no part of this reissue specification; matter printed in italics indicates the additions made by reissue.

This invention relates to a [flat] rotary pump of entirely novel design. It relates more particularly to a rotary pump wherein one of the pumping elements may be fixed and the other subjected to a compound movement wherein there are a minimum of moving parts.

It is an object of the present invention to provide such a novel pump which will be relatively simple to manufacture and therefore less expensive than comparable pumps now available. It is another object of our invention to provide a pump of such nature that there is no need for the individual pumping elements to be matched to each other whereby production may be greatly speeded up.

It is yet another object of the present invention to provide a device as above outlined which, with relatively minor modification, may be made in the form of a pump, a compressor or an expander without departing from the principles of this invention.

These and other objects of our invention which will become apparent as the specification proceeds or which will be pointed out in more detail hereinafter we accomplish by that certain construction and arrangement of parts of which we shall now describe one exemplary embodiment. Reference is made to the drawings forming a part hereof and in which.

Briefly, in the practice of our invention we provide a pump having two pumping elements, one of which may be fixed and the other of which is subjected to a compound movement with respect to the first. The pumping elements [are] *may be*, generally speaking, flat and have on their mutually opposed faces generally spiral threads. In the particular embodiment disclosed the fixed element or stator has a double thread, while the movable element or rotor has a single thread. It will of course be understood that the positions of the two elements could be reversed so that the single thread element could be the stator and the double thread element could be the rotor.

Since the pumping action is produced by the movement of one of the elements in relation to the other, it is also of course possible to rotate both elements in the same or opposite directions and still produce a pumping action.

If the rotor and stator are superimposed on each other, it will be found that the pumping pockets are arcuate in shape and pointed at both ends. Since the circumference of a circle increases in direct proportion to the radius, it will be clear that if the pitch of the spiral threads of rotor and stator are constant the volume of the pumping pockets will not be the same as the pocket moves across the interface of the pumping elements. They will be smaller near the center and larger near the periphery. Thus, if the pumping elements are provided with threads of constant pitch and the rotor is rotated in such a direction to cause the pumping pockets to move outwardly, the device will be an expander. If, conversely, the rotor is rotated in a direction to cause the pockets to move inwardly, the device will be a compressor. It will also be clear that in order to provide a constant volume pump it is necessary to vary the pitch of the threads as they pass from the center toward the periphery or vice versa. In other words, the threads must be closer together at the periphery than they are at the center. Under these conditions there will be provided constant volume pumping pockets and the device will operate as a constant volume pump no matter in which direction the rotor is rotated with respect to the stator.

Figure 2:
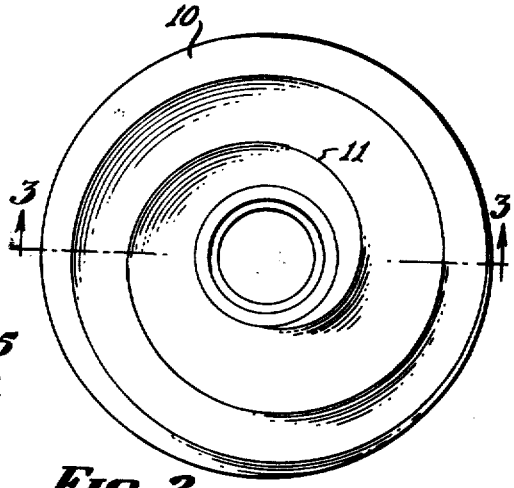
Figure 2 is a plan view of one of the pumping elements.

Referring now more specifically to Figure 2, the pumping element there shown is, in the particular embodiment illustrated—the rotor, and is indicated by the numeral 10. The numeral 11 indicates the crest of the thread which follows a spiral path from the center outward.

Figure 4:
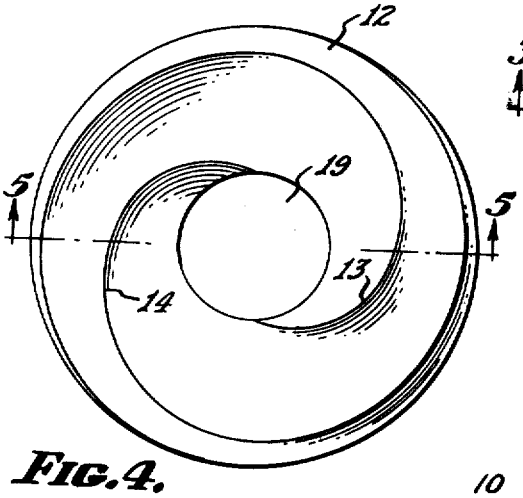
Figure 4 is a plan view of the other pumping element.
Figure 3:
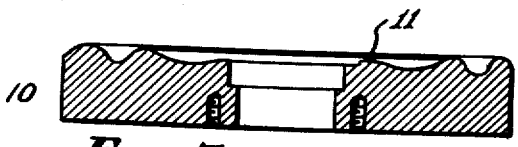
Figure 3 is a cross sectional view of the same on the line 3—3 of Figure 2.
Figure 5:
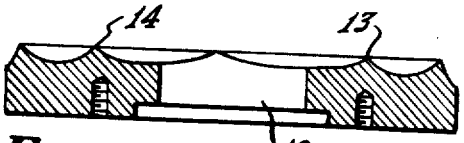
Figure 5 is a cross sectional view of the other pumping element taken on the line 5—5 of Figure 4.

The stator is indicated at 12 and is shown in more detail in Figures 4 and 5. Here the element has two threads the crests of which are indicated respectively at 13 and 14. Figures 3 and 5 respectively show cross sectional views of the rotor and stator of Figures 2 and 4 respectively.

Figure 1:
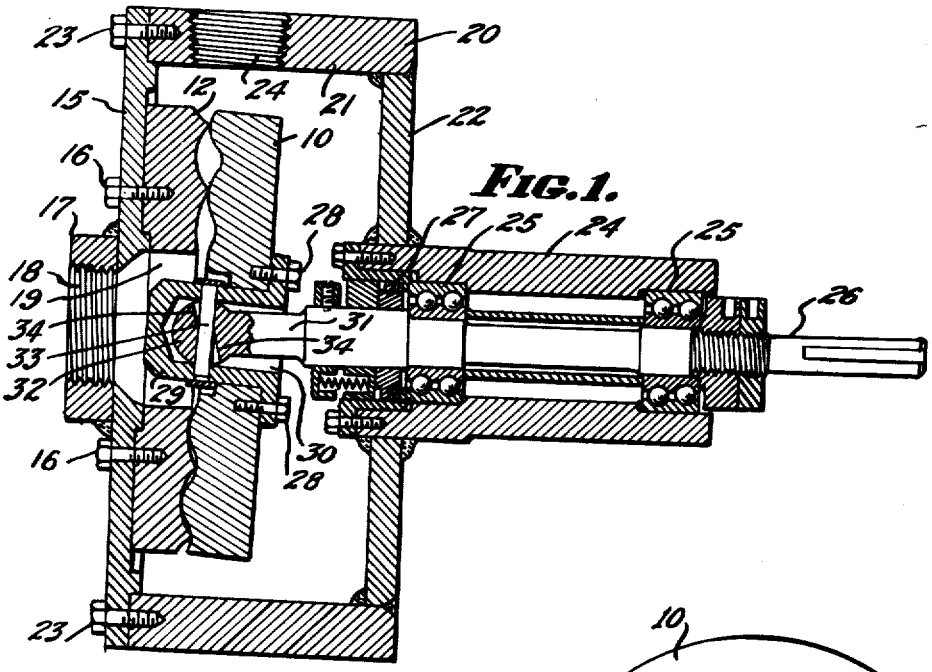
Figure 1 is a central cross sectional view through a pump according to the present invention.

The assembly of the pump is shown in Figure 1. The pump is provided with a head indicated at 15 to which the stator 12 may be bolted as indicated at 16. A port fitting 17 may be welded to the head 15 as shown and may be provided with threads 18 for the attachment of pipe thereto. The stator of course has the central hole 19 for the passage of the fluid being pumped.

A casing member 20 which may be fabricated as shown from a ring 21 and a plate 22 or which may of course be an integral casting is bolted to the head 15 as at 23. The casing member is provided with a port opening 24 which may be threaded as shown.

Cast integrally with the plate 22 or welded thereto as shown is provided a sleeve 24. The sleeve 24 may be provided with ball bearings 25 for the drive shaft 26 and preferably suitable sealing means will be provided as indicated generally at 27. The particular sealing means form no part of the present invention and will therefore not be described in detail. Power may be applied to the shaft 26 by means of a suitable electric motor or in any desired manner.

The motion of the rotor with respect to the stator is a compound motion as pointed out above. This motion involves a rotation of the rotor about an axis which is tilted with respect to the stator axis and the axis of tilt of the rotor moves azimuthally, or nutates, with respect to the stator. The movement of the rotor axis is analogous to the movement of the axis of a spinning top except that the axis of tilt remains constant.

In order to provide for the movement above outlined a universal joint must be provided. As shown in Figure 1, there is secured to the rotor 10 by means of bolts 28 a cup 29 having an accurately bored hole therein at 30. The drive shaft 26 terminates in a portion 31 of reduced diameter on the end of which is provided a spherical terminus 32. The ball 32 fits accurately within the hole 30 and turning movement is transmitted from the shaft to the rotor by means of a pin 33 fitting tightly in diametrically opposed holes in the cup 29 and passing through a slot 34 which at its center is of a size to snugly fit the pin 33 but which flares at its end to permit of a rocking movement of the pin 33 with respect to the ball 32.

From the foregoing description it will be clear that as the shaft 26 rotates the pumping element 10 is caused to rotate also. But by virtue of the configuration of the threads 11, 13 and 14, the rotation of the element 10 will be accompanied by a wobbling or nutating movement of the tilt axis in a direction opposite to the direction of rotation of the shaft 26.

The specific configurations of the surfaces of the rotor and stator members are fully disclosed and claimed in the copending application of Sheldon S. L. Chang, Serial No. 159,077, filed April 29, 1950 co-pending with the present case, *now Patent No. 2,590,435, dated March 25, 1952.* A machine for turning the pumping elements is disclosed and claimed in the co-pending application in the names of Chang and Hagerman Serial No. 146,344, filed February 25, 1950, *now Patent No. 2,566,116, dated August 28, 1951.* For a fuller understanding of the nature of the surfaces involved and methods of production of such surfaces, reference is made to said copending applications.

In the embodiment illustrated it will be preferable that the port 18 be the intake port and the port 24 be the exhaust port. Thus the fluid being pumped would be pressing the rotor against the stator so that a tighter fit would be produced whereby slip is reduced. It follows from what has been said that the precision of the components is not too critical. Thus, one of the two members may be made from molded rubber-like material and the other may probably be made as a die casting without further machine work. It will also not be necessary to employ any selective fitting process because of the considerations mentioned above.

It will also be clear that the stator member may be made double sided or, in other words, it could consist in effect of two stator members back to back with a rotor operating against each surface. In this manner a double acting pump or multiple pump can easily be provided.

It will also be clear that the stator member itself may be a part of the casing head and does not need to be a separate member secured to the casing head. Similarly the pump casing may be made a part of the motor casing of the drive motor with simply a partition wall between the two and sealing means for the shaft.

Numerous other modifications will suggest themselves to those skilled in the art, and we therefore do not intend to limit ourselves otherwise than as set forth in the claims which follow.

Having now fully described our invention, what we claim as new and desire to secure by Letters Patent is:

1. A pump comprising a pair of pumping elements, a universal joint, one of said elements having a single spiral thread and the other of said elements having a double spiral thread, said threads progressing outwardly from their respective axes, one of said elements being fixed, and the other having its axis at an angle to the axis of the first, and being rotationally driven through said universal joint, whereby said driven element will turn in one direction about said tilted axis, while said axis of tilt is nutating in the opposite direction, said pumping elements being enclosed within a casing having intake and exhaust ports.

2. A pump according to claim 1, wherein the pitch of said spiral threads constantly decreases with an increase in their distance from the center of said elements, whereby constant volume pumping pockets are provided.

3. A pump according to claim 1, wherein the pitch of said spiral threads is constant, whereby the volume of the pumping pockets decreases as the pockets move inward, whereby said pump operates as a compressor.

4. A pump according to claim 1, wherein the pitch of said spiral threads is constant, whereby the volume of the pumping pockets increases as the pockets move outward, whereby said pump operates as an expander.

5. A pump comprising a pair of pumping elements, one of said elements having a double spiral thread and being fixed, the other of said elements having a single spiral thread, said threads progressing outwardly from their respective axes, said other element being arranged for compound movement with respect to said fixed element, said arrangement comprising a drive shaft rotating on a fixed axis, and a universal joint connection between said drive shaft and said other element, said compound motion comprising a rotation of said element about a tilted axis, accompanied by a nutational movement of said axis of tilt, said pumping elements being enclosed within a casing having intake and exhaust ports.

6. A pump according to claim 5, wherein the pitch of said spiral threads constantly decreases with an increase in their distance from the center of said elements, whereby constant volume pumping pockets are provided.

7. A pump according to claim 5, wherein the pitch of said spiral threads is constant, whereby the volume of the pumping pockets decreases as the pockets move inward, whereby said pump operates as a compressor.

8. A pump according to claim 5, wherein the pitch of said spiral threads is constant, whereby the volume of the pumping pockets increases as the pockets move outward, whereby said pump operates as an expander.

References Cited in the file of this patent or the original patent

UNITED STATES PATENTS

| Number | Name | Date |
|---|---|---|
| 615,392 | Kelley | Dec. 6, 1898 |
| 1,389,189 | Feuerheerd | Aug. 30, 1921 |
| 2,212,417 | George | Aug. 20, 1940 |
| 2,324,168 | Montelius | July 13, 1943 |
| 2,353,373 | Thompson | July 11, 1944 |
| 2,512,764 | Byram | June 27, 1950 |

FOREIGN PATENTS

| Number | Country | Date |
|---|---|---|
| 28,560 | Denmark | Sept. 21, 1921 |
| 129,104 | Austria | July 11, 1932 |
| 367,086 | Great Britain | Feb. 18, 1932 |
| 411,528 | Great Britain | Jan. 21, 1936 |
| 622,583 | Great Britain | May 4, 1949 |
| 813,559 | France | Mar. 1, 1937 |

Certificate of Correction

Reissue No. 23,870 September 21, 1954

Frederick Cameron Byram et al.

It is hereby certified that error appears in the above numbered patent requiring correction as follows:

In the heading to the drawing, line 2; and in the heading to the printed specification, line 2, title of invention, for "FLAT ROTARY PUMP" read ROTARY PUMP ;

and that the said Letters Patent should be read as corrected above.

Signed and sealed this 23rd day of November, A. D. 1954.

[SEAL]

ARTHUR W. CROCKER,
*Assistant Commissioner of Patents.*